Dec. 31, 1957     I. HOROWITZ     2,818,289

TOP FITTING CASTINGS

Filed Sept. 14, 1953     2 Sheets-Sheet 1

INVENTOR
Isadore Horowitz
BY Robert van Sichler
ATTORNEY

Dec. 31, 1957  I. HOROWITZ  2,818,289
TOP FITTING CASTINGS
Filed Sept. 14, 1953  2 Sheets-Sheet 2

INVENTOR
*Isadore Horowitz*
BY *Robert van Sickler*

ATTORNEY

United States Patent Office
2,818,289
Patented Dec. 31, 1957

2,818,289

TOP FITTING CASTINGS

Isadore Horowitz, Shreveport, La.

Application September 14, 1953, Serial No. 379,857

2 Claims. (Cl. 287—54)

This invention relates to metal castings and particularly sockets utilized as top fittings for connections at the junction of tubular horizontal and intersecting angular supports on each end of a playground apparatus.

The top fittings, of malleable iron, steel, cast iron, aluminum or any suitable metal are bolted or welded to the top horizontal bar and are provided with a connecting inverted V-socket web joining the angular leg sockets to receive the leg tubings of the structure. Although the subject fittings are primarily used on playground and gymnasium apparatus it can readily be understood that these fittings are adaptable for use in tressels, horses, and other tubing apparatus requiring rigid connections where there are constant strains at the junctions.

In constructions of these types, the conventional means for securing the intersecting horizontal and angularly disposed shafts and tubings, such as used in slides, gym sets and other playground apparatus, have been unsatisfactory due to the failure to provide adequate strength to withstand the wear and strain at these locations. The rough use to which these apparatus are put tends to weaken the connections and the subject invention is designed to minimize this wear which previously has required constant repair or replacement of worn parts.

It is an object of my invention to provide cast top fittings where the intersecting horizontal and vertical shafts of a playground apparatus are of one piece and reduce dislodgement of these sections to a minimum.

Another object is to provide for adjustment of the top fittings to the angularly disposed apparatus leg supports.

A further object is to provide a connection which prevents relative movement of the tubular sections.

An additional and important object is to provide a strengthening connection between the two flat web faces of the top fittings.

Still another object is to position the ends of the angular shafts of the playground apparatus at locations to insure rigid connections.

It is also an object of this invention to provide top fittings which will enable the sections of the playground apparatus to be quickly assembled.

Other and further objects of the invention will be readily apparent from a study of the following specification describing the preferred form and modification of the top fittings together with the drawings in which:

Figure 7 is a top plan view of the fitting, while

Figure 1:
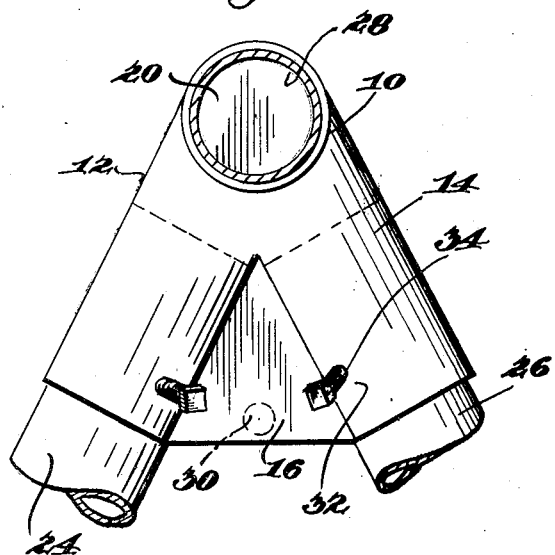
Figure 1 is a front view of the top fitting applied to inwardly converging tubular leg supports.
Figure 2:
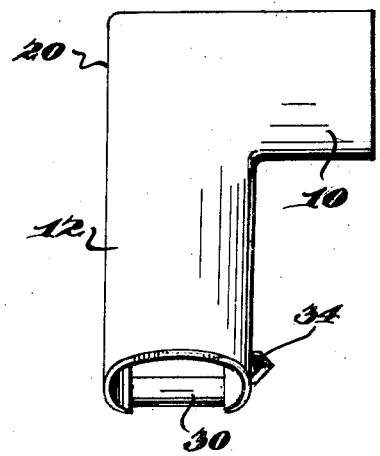
Figure 2 is a side elevation of only a top fitting.
Figure 3:
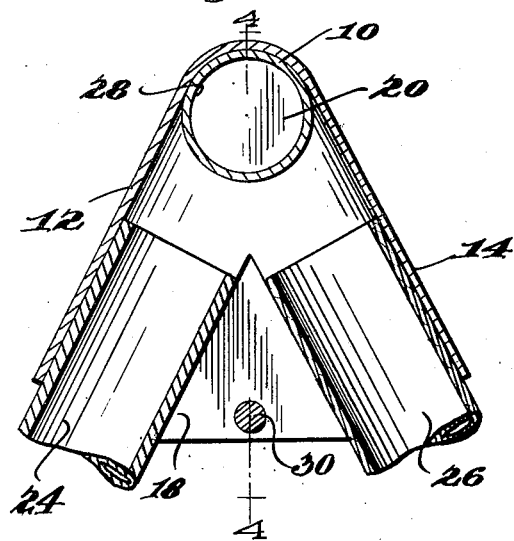
Figure 3 is a vertical sectional view taken through a top fitting and the intersecting tubular members of a playground apparatus.
Figure 4:
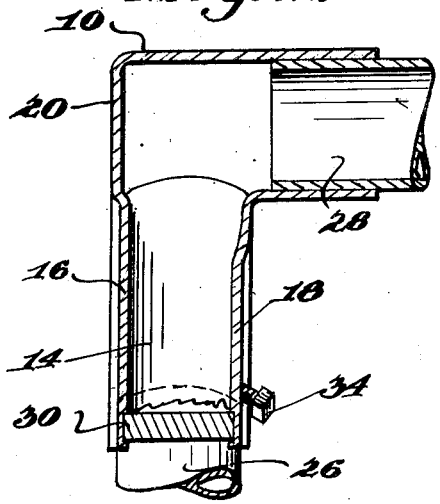
Figure 4 is another vertical section taken on the line 4—4 of Figure 3.

In the drawings where like reference characters denote like parts, the numeral 10 refers to the tubular horizontal bar integrally connected to converging partial tubings 12 and 14. A front web 16 and rear web 18 are provided connecting the two tubings 12 and 14. A closure end 20 is provided on the rear of the tubular member 10.

The tubular members or sockets are mounted on the ends of the angularly disposed shafts 24 and 26, these shafts being the major supports on each end of the playground apparatus. The ends 28 of the main horizontal tubing of the playground apparatus are adapted to be received in the collars or tubular bars 10 positioned on each side of the apparatus. The two flat faces or webs 12 and 14, formed integrally or secured by welding with the short tubings 12 and 14, are connected by the strengthening bar 30. This bar 30 is positioned in the lower central portions of the triangular webs 16 and 18, and serves to brace these webs in spaced parallel relationship. It is to be noticed that the distance between these webs is less than the diameter of the two tubings 12 and 14 causing the surfaces to be recessed in this central portion of the top fitting on both sides.

Threaded apertures 32 are located on the outer periphery of the tubing or collars 12 and 14 adapted to receive thread-bolts 34. These bolts serve to secure the collars 12 and 14 rigidly to the ends of the apparatus shafts 24 and 26. The ends of the horizontal apparatus bar 28 may be rigidly secured to the collar member 10 of each top fitting and welded or otherwise attached to provide a secure connection. It is to be noticed that the ends of the horizontal bar 28 may be spaced from the end wall 20 or may be forced completely within this collar so as to abut the wall 20.

Due to the unitary connection that is provided by these top fittings the top horizontal bar and the angularly disposed supporting legs of the playground apparatus are securely held and maintained in relative positions that preclude dislodgement of these supporting members. Because of this rigidity of these members, despite lengthy use, the minimum of repair and replacement of worn parts is effected.

The apertures 32 for the threaded bolts 34 are provided in the tubular portions 12 and 14 adjacent the inner edges and are directed inwardly and upwardly. Due to this angularity a wedging action is acquired when the ends of the bolts 34 engage the top of the apparatus shafts 24 and 26. This minimizes the possibility of the shafts becoming loose in the collars for any downward or side pull will tend to make the connection more secure at these locations.

Figure 5:
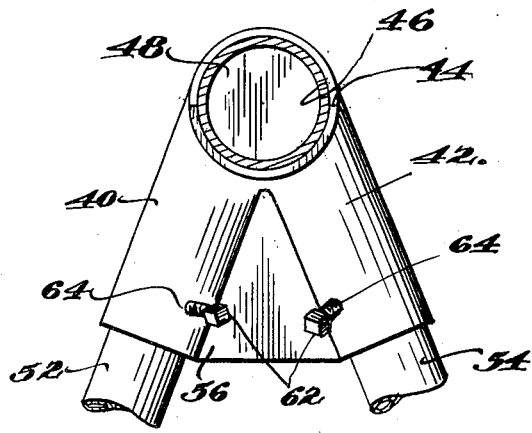
Figure 5 is a front elevation, similar to Figure 1, of a modification of the invention.
Figure 6:
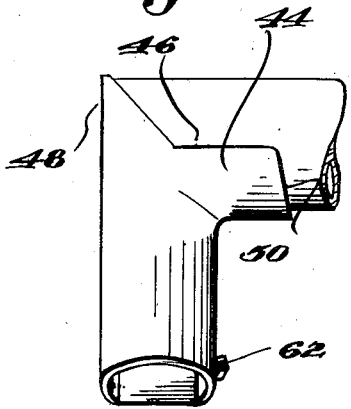
Figure 6 is a side elevation of the modification showing the fitting applied only to the top horizontal bar of a playground apparatus.
Figure 7:
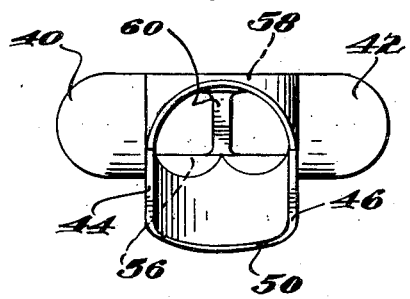
Figure 8:
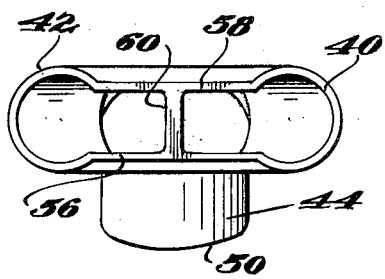
Figure 8 is a bottom plan view of the same.

In the modification disclosed in Figures 5, 6, 7 and 8, the reference numerals 40 and 42 indicate the upwardly and inwardly slanting tubular collar members and, as shown in the preferred form of the invention, are partially circular in cross-section. The horizontal collar member 44 in this modification is open on top leaving approximately one-half of the horizontal apparatus bar 46 exposed when this form of top fitting is installed on the bar ends. The metal, however, is increased toward the rear of the collar so as to form a continuous surface at the junction with the rear wall 48. It is also to be noticed that with the retained metal of the collar is tapered in front as at 50.

The two converging collar members 40 and 42, which receive the ends 52 and 54 of the main apparatus support, are connected as is shown in the preferred form, by two flat triangular recessed front and rear web portions 56 and 58. These V-shaped web portions are cast integral with the collars 40 and 42 and are maintained in spaced relationship by a short strengthening member 60. Alcally shown in Figures 5 and 6, threaded
sed in inwardly and upwardly slanting
 64 to maintain and secure the appa-
d 54 in adjusted positions.
rred form, the ends of the horizontal
yground apparatus is received in the
 members 44 and may be secured by
 conventional means. Normally, the
, when in position, are adapted to abut
 although if necessary, these ends may
e inner walls of the closure members
gths of tubing are used or adjustment
being welded into position.
shown in the preferred form, the tri-
ons are held in spaced relationship and
 area therebetween and the particular
g of the threaded bolts at the approxi-
he web and collar members when the
 in adjusted position on the apparatus
 legs or shafts 52 and 54 there is little
r dislodgement despite rough use or
ground apparatus. Increased rigidity
e angular positioning of the bolts 62
enings 64 are off center adjacent the
 This positioning will minimize any
ve movement of the shafts 52 and 54
d 42.
at additional strength is provided for
 the horizontal bar 46 with the fitting
is welded in position a complete seal
welding material along the continuous
ollar on top.
 clarity, the shafts 52 and 54 are not
6, 7 and 8, and the horizontal bar 46
gures 5 and 6.
 described the illustrated embodiments
 detail, it will be understood by those
that variations may be made without
e spirit of the invention. The various
ified or changed to meet conditions, but
ct disclosure only broadly deflects this
o not, therefore, wish to be limited to
diments of the invention shown and
out claim as the invention all modifica-
in the scope and purview of the apas new is:
et for a playground apparatus having
d converging supports, said socket hav-
bular member closed at one end and
two converging tubular leg members, a pair of flat triangular shaped web portions connecting said leg members on each side thereof, said web portions spaced a shorter distance from each other than the diameter of said leg members, said horizontal tubular member communicating with said converging tubular leg members at the junction thereof, a connecting rod positioned between the two web portions in the lower central portion thereof, said horizontal tubular member adapted to receive an end of the horizontal bar of said playground apparatus and said converging leg members mounted on the ends of the converging supports of said playground apparatus.

2. In a leg socket for a playground apparatus having a horizontal bar and converging supports, said socket having a horizontal tubular member closed at one end and two converging tubular leg members, a pair of flat triangular shaped web portions connecting said leg members on each side thereof, said web portions spaced a shorter distance from each other than the diameter of said leg members, said horizontal tubular member communicating with said converging tubular leg members at the junction thereof, a connecting rod positioned between the two web portions in the lower central portion thereof, said horizontal tubular member adapted to receive an end of the horizontal bar of said playground apparatus, said converging leg members being mounted on the ends of the converging supports of said playground apparatus, and securing means for said converging leg members mounted on the ends of said converging leg supports comprising a pair of inwardly and upwardly disposed threaded bolts at the junction of said web portions with said leg members on one side thereof whereby relative movement of the converging supports of said playground apparatus is prevented.

References Cited in the file of this patent
UNITED STATES PATENTS

| | | |
|---|---|---|
| 1,314,495 | Albach | Sept. 2, 1919 |
| 1,390,807 | Mintz | Sept. 13, 1921 |
| 1,556,624 | Pavenick | Oct. 13, 1925 |
| 1,938,809 | Coe | Dec. 12, 1933 |
| 1,953,012 | Gerrard | Mar. 27, 1934 |
| 2,171,681 | Burke | Sept. 5, 1939 |
| 2,330,766 | Walstrom | Sept. 28, 1943 |
| 2,560,713 | Bender | July 17, 1951 |
| 2,603,272 | Rowand | July 15, 1952 |
| 2,638,386 | Larson | May 12, 1953 |
| 2,681,780 | Santaro | June 22, 1954 |